United States Patent [19]
Lunden

[11] 3,904,044
[45] Sept. 9, 1975

[54] STICKER PLACEMENT DEVICE FOR LUMBER STACKING APPARATUS

[75] Inventor: Sidney L. Lunden, Spokane, Wash.

[73] Assignee: Moore-lem, Inc., Spokane, Wash.

[22] Filed: July 26, 1973

[21] Appl. No.: 382,740

[52] U.S. Cl............................ 214/6 M; 214/6 DK
[51] Int. Cl.² ........................................ B65G 57/26
[58] Field of Search .................. 214/6 DK, 6 M, 6 N

[56] References Cited
UNITED STATES PATENTS

| | | | |
|---|---|---|---|
| 1,490,594 | 4/1924 | De Lateur | 214/6 DK |
| 3,169,646 | 2/1965 | Mason | 214/6 DK |
| 3,437,215 | 4/1969 | Lunden | 214/6 DK |
| 3,610,443 | 10/1971 | Brumunddal et al. | 214/6 DK |
| 3,703,965 | 11/1972 | Coats | 214/6 M |
| 3,738,510 | 6/1973 | Mason | 214/6 DK |

Primary Examiner—Robert J. Spar
Assistant Examiner—Leslie J. Paperner
Attorney, Agent, or Firm—Wells, St. John & Roberts

[57] ABSTRACT

A sticker placing apparatus is described for use with lumber stacking machines to automatically place stickers under successive layers of boards as the stack is being formed. The device includes a single magazine from which stickers are moved across the stacking apparatus to spaced unloading stations by an indexing conveyor means. Stickers are removed from the unloading stations by unloading means in timed sequence to the deliverance of a layer of boards to the stack. Means is provided to hold the removed stickers against the undersides of the delivered layers of boards as the layers are deposited onto a stack.

20 Claims, 24 Drawing Figures

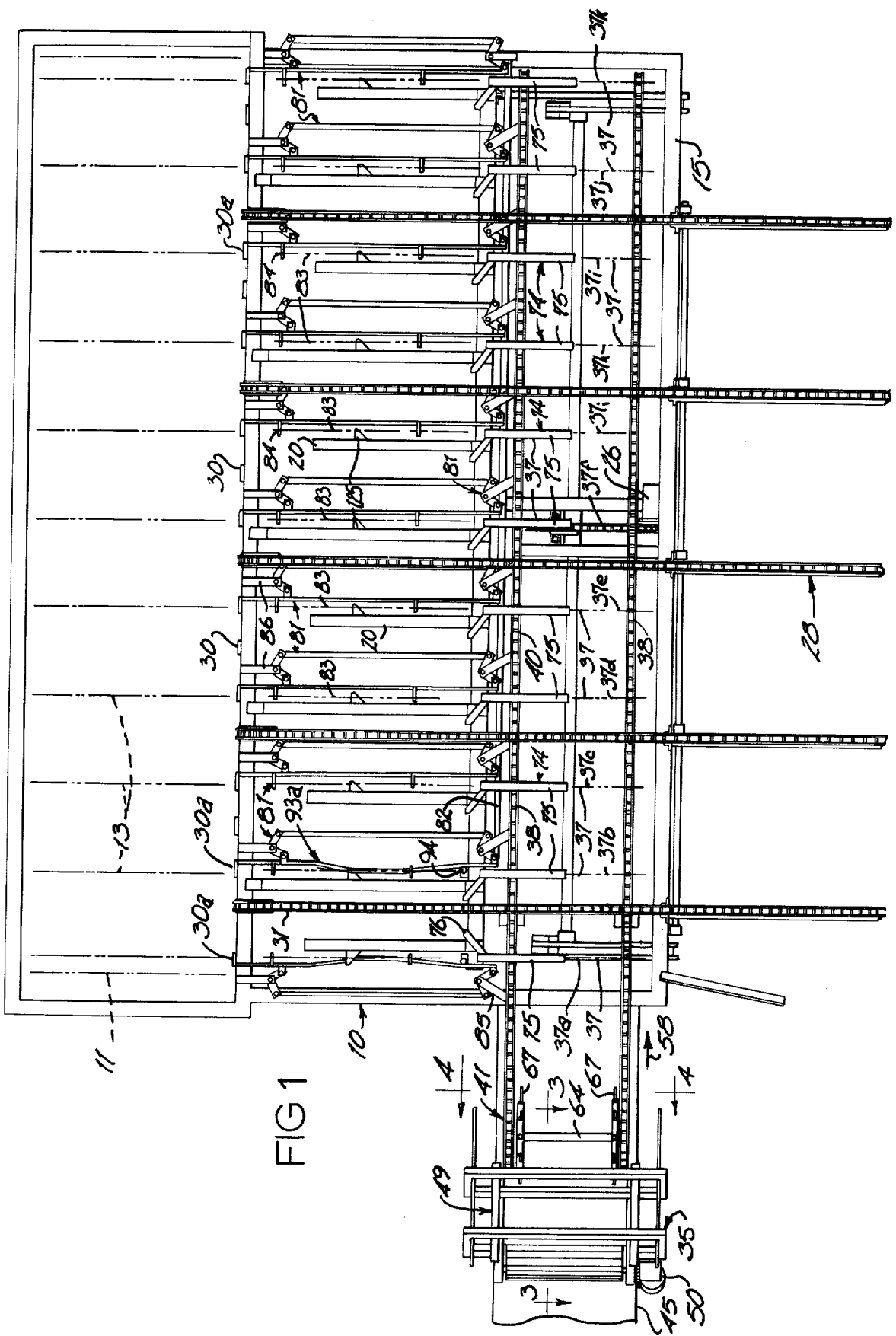

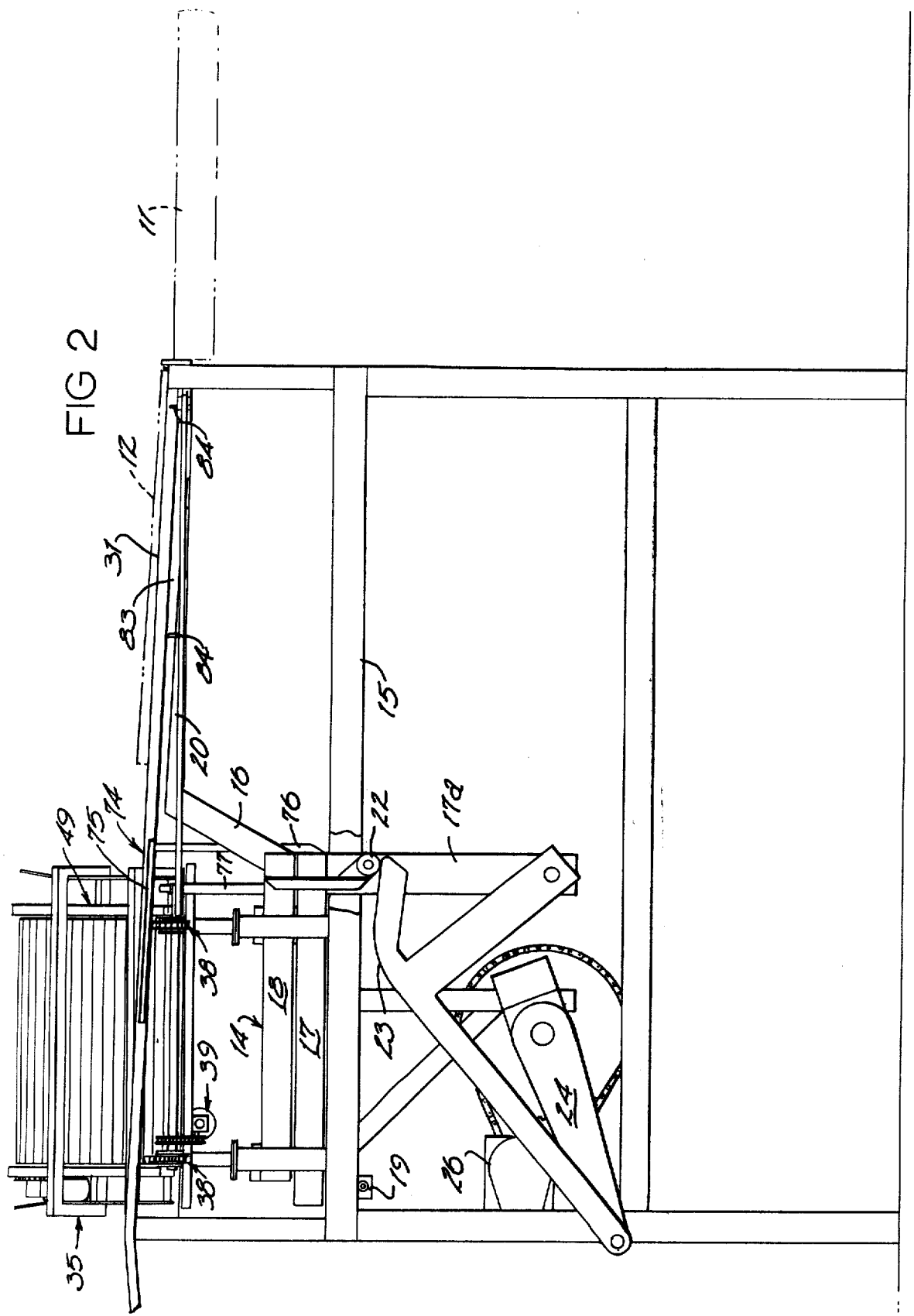

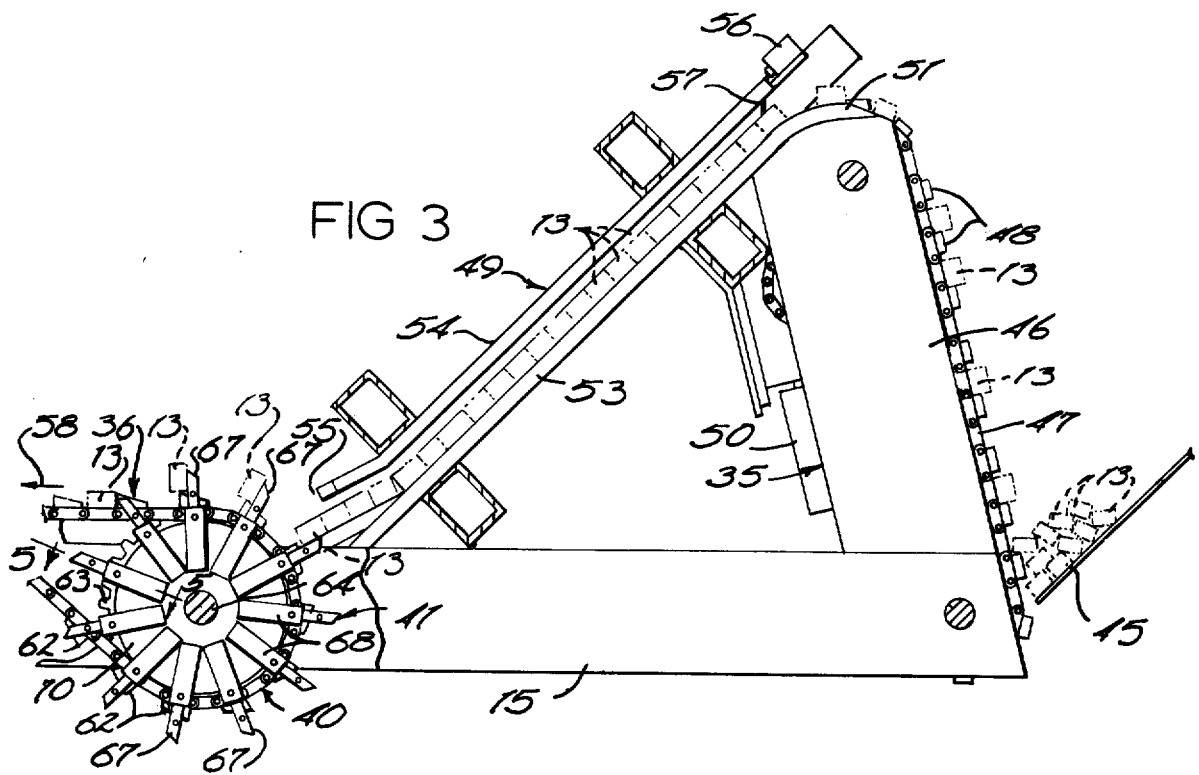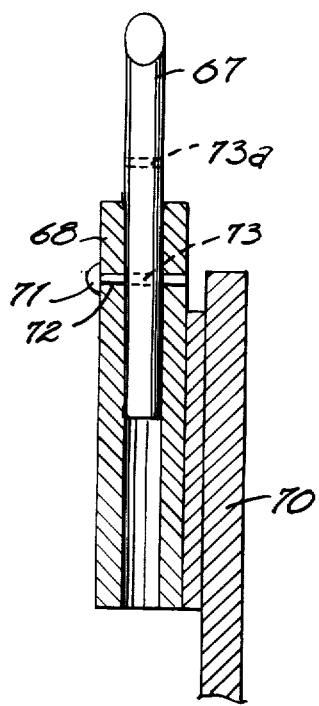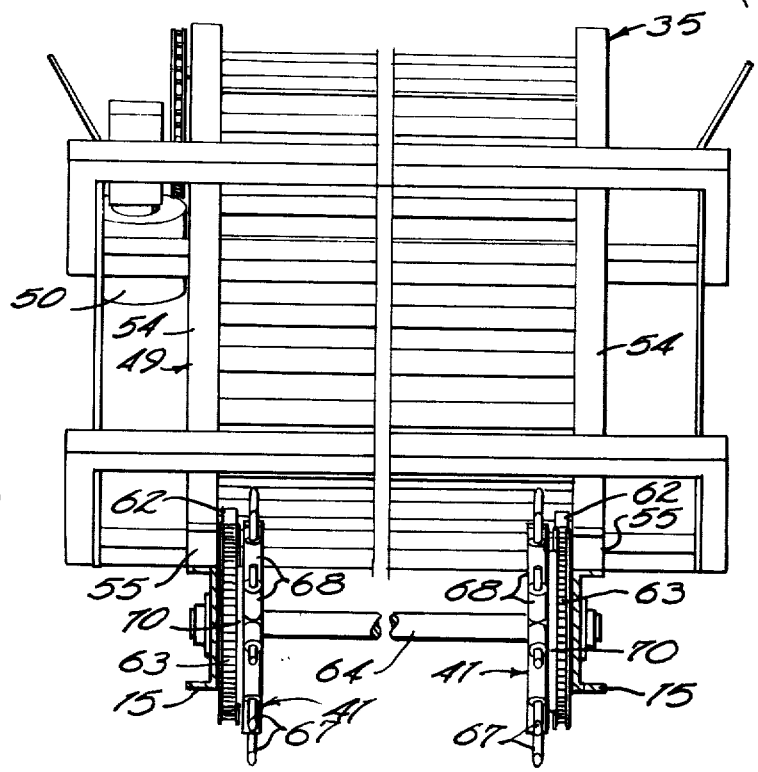

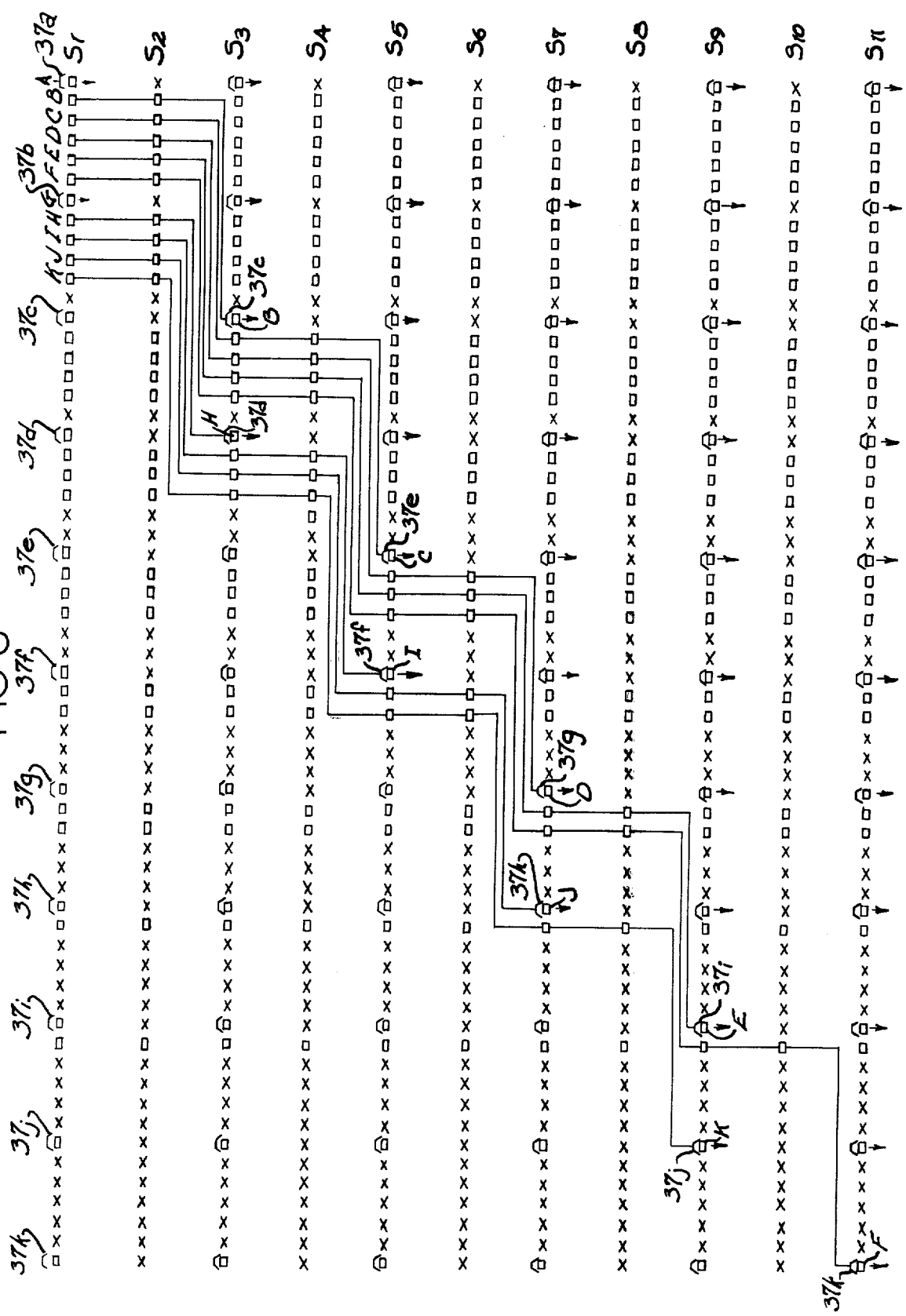

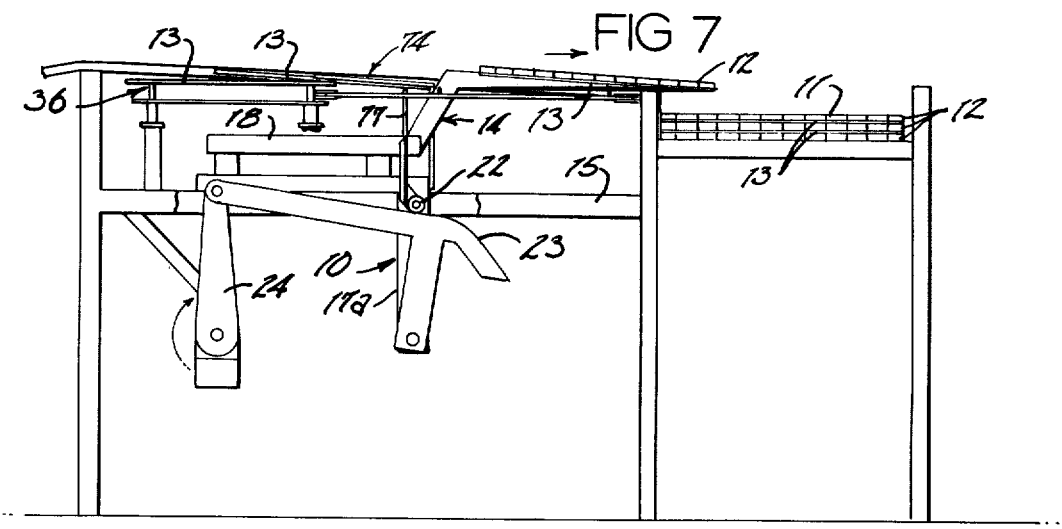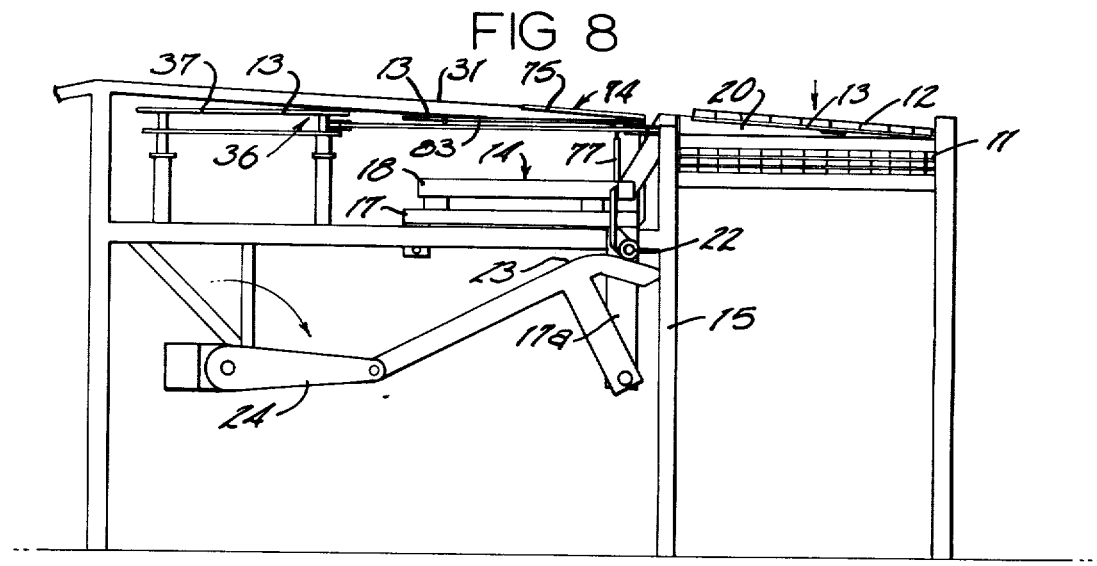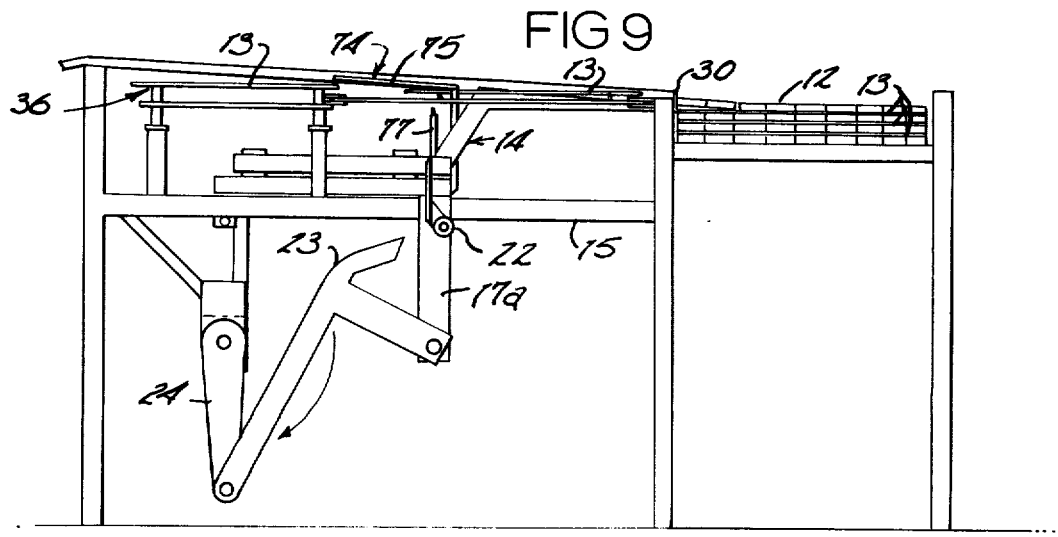

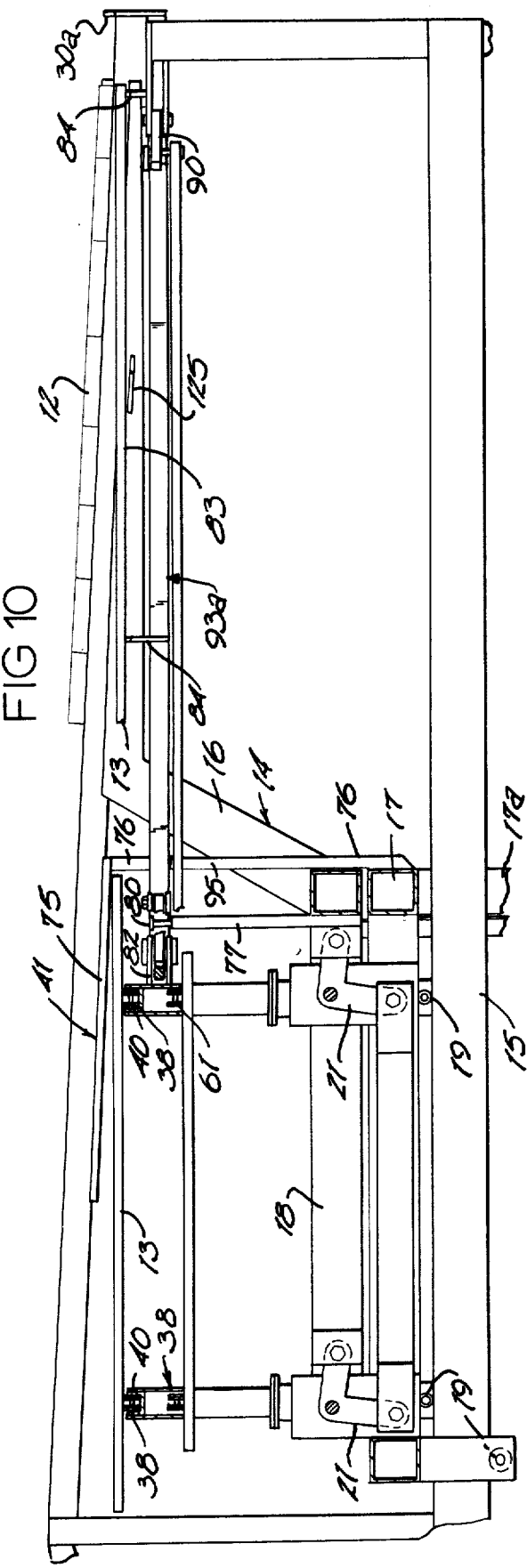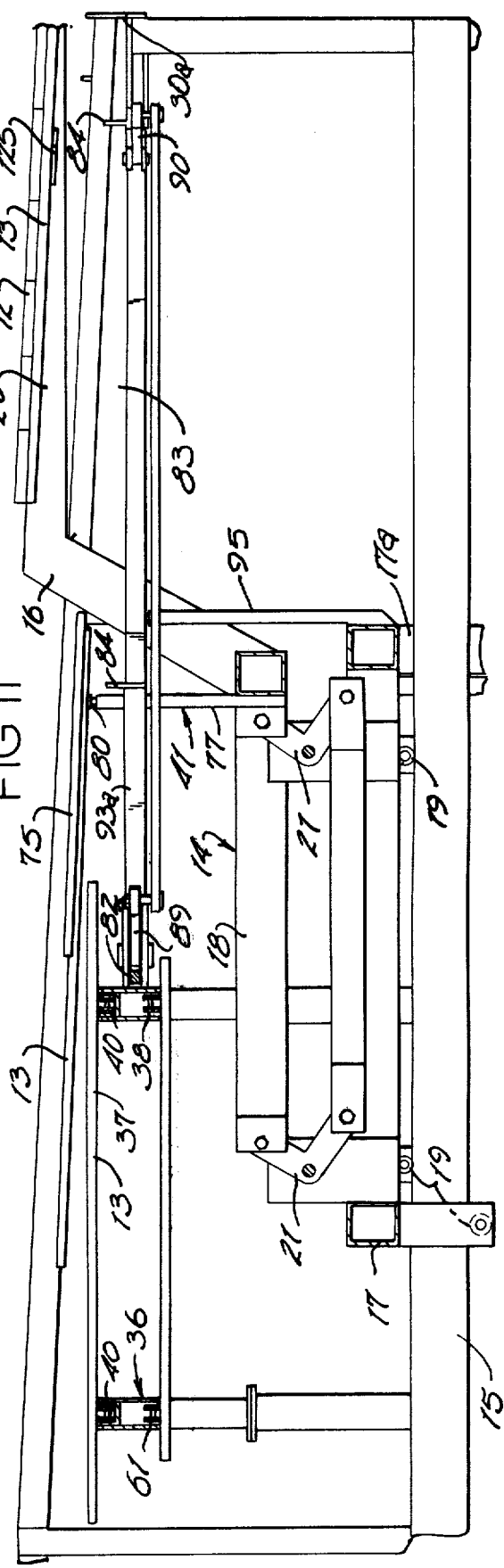

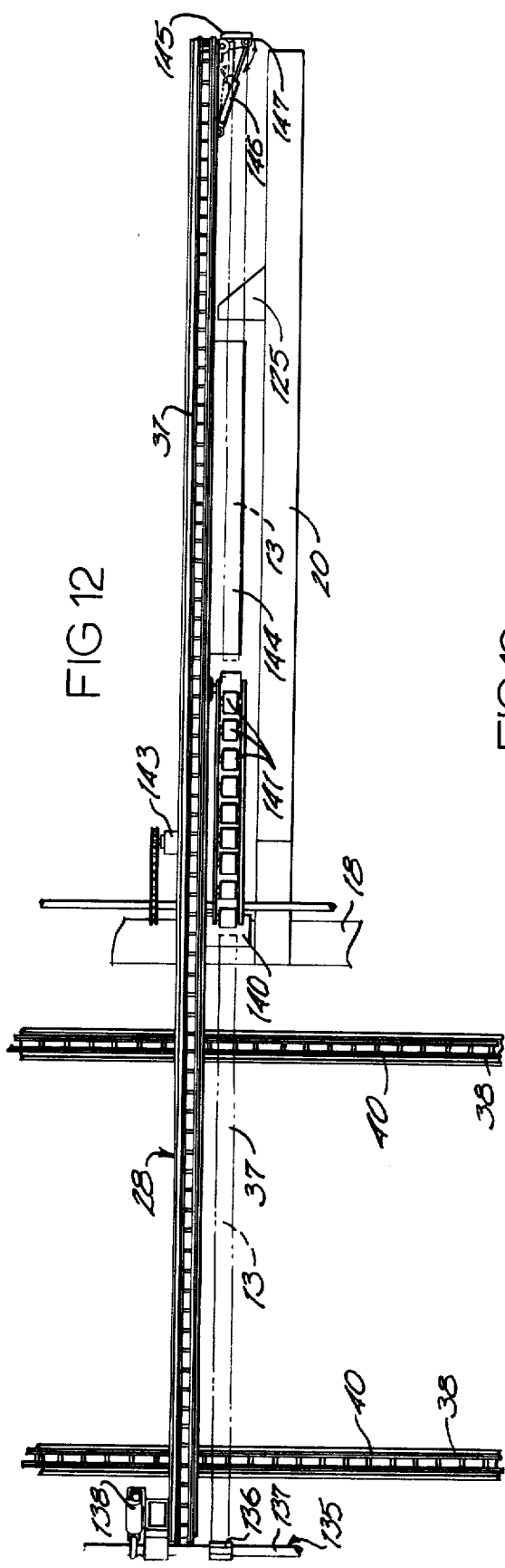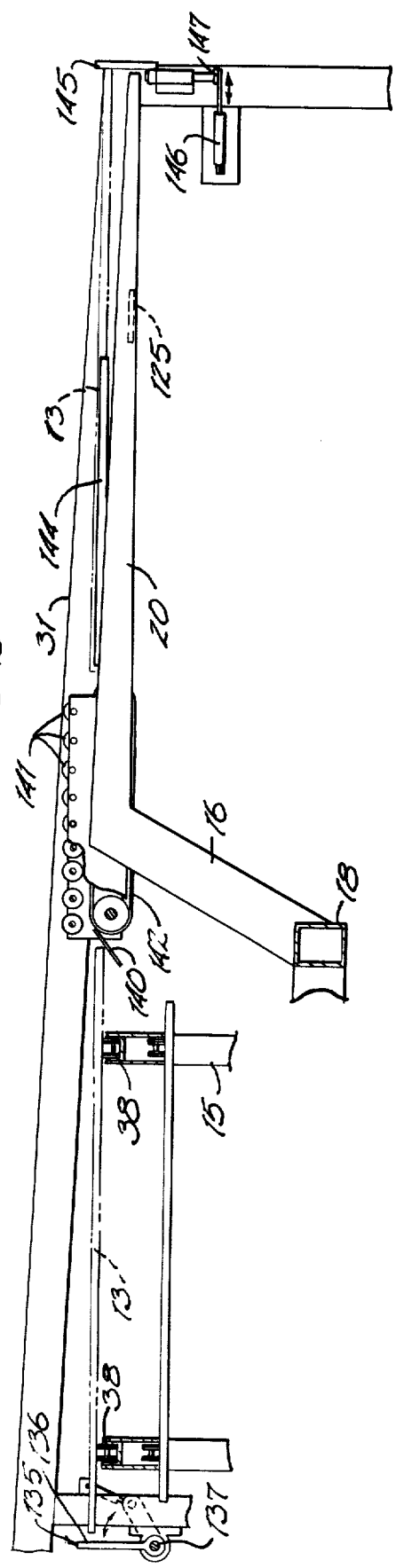

3,904,044

STICKER PLACEMENT DEVICE FOR LUMBER STACKING APPARATUS

BACKGROUND OF THE INVENTION

This invention relates to lumber stacking machines and more particularly to devices for automatically placing stickers between layers of boards during the formation of lumber stacks.

In the lumber industry, boards that have been freshly cut from logs are generally sorted and stacked for drying in a dry kiln. During the stacking operation, stickers, or elongated wooden slats, are placed between layers at spaced intervals. The stickers serve to separate the layers and enable the drying gases in the kiln to circulate through the stack and uniformly dry the boards.

In most stacking operations today, the stickers are manually placed between the layers. Although automatic sticker placing equipment has been developed, the installation and use of such equipment can normally only be justified in the largest of operations. It is also not infrequent that automatic sticker placing equipment has been installed and subsequently removed because of inefficiencies within the equipment.

Most existing automatic sticker placing apparatus include individual sticker magazines adjacent each sticker placement station for storing the stickers to be placed between the layers of boards. Loading the magazines can often require the full attention of at least one man while another is required to operate the stacking machine.

It is therefore one of the principal objects of this invention to provide an automatic sticker placing device for lumber stacking apparatus that generally reduces the cost of performing the stacking operation.

An additional object of this invention is to provide an automatic sticker placing device that has a single magazine for storing the stickers utilized in the stacking operation wherein the stickers may be loaded in an unsorted array.

A further object of this invention is to provide an automatic sticker placing device that is simple, efficient to operate, and easy to maintain.

An additional object of this invention is to provide an automatic sticker placing device that is inexpensive to manufacture.

A yet further object of this invention is to provide an automatic sticker placing device that includes means for selecting the number and the spacing of the stickers to be placed between each layer of boards.

An additional object of this invention is to provide a sticker placing device for a stacking machine having a fork lift type layer support that simultaneously moves a layer of boards and stickers in front of stripping members and then down onto the stack and then back to strip the layer of boards and stickers onto the stack.

These and other objects and advantages of the invention will become apparent upon reading the following detailed description with reference to the accompanying drawings.

BRIEF DESCRIPTION OF THE DRAWINGS

A preferred embodiment of this invention is illustrated in the accompanying drawings, in which:

FIG. 1 is a plan view of a stacking machine with the automatic sticker placing device;

FIG. 2 is a side elevational view of the apparatus shown in FIG. 1;

FIG. 3 is an enlarged sectional view taken along 3—3 in FIG. 1;

FIG. 4 is a fragmentary sectioned view taken along line 4—4 in FIG. 1;

FIG. 5 is an enlarged fragmentary view taken along line 5—5 in FIG. 3.

FIG. 6 is a diagrammatical view showing the progress of a group of stickers across the indexing conveyor means;

FIGS. 7-9 are schematic operational views of the stacking machine;

FIGS. 10 and 11 are fragmentary sectioned views illustrating the operation of the stacker and sticker unloading means;

FIG. 12 is a fragmentary plan view of an alternate form of the sticker unloading means;

FIG. 13 is an elevational view of the unloading means shown in FIG. 12;

DETAILED DESCRIPTION OF A PREFERRED EMBODIMENT

Figure 14:
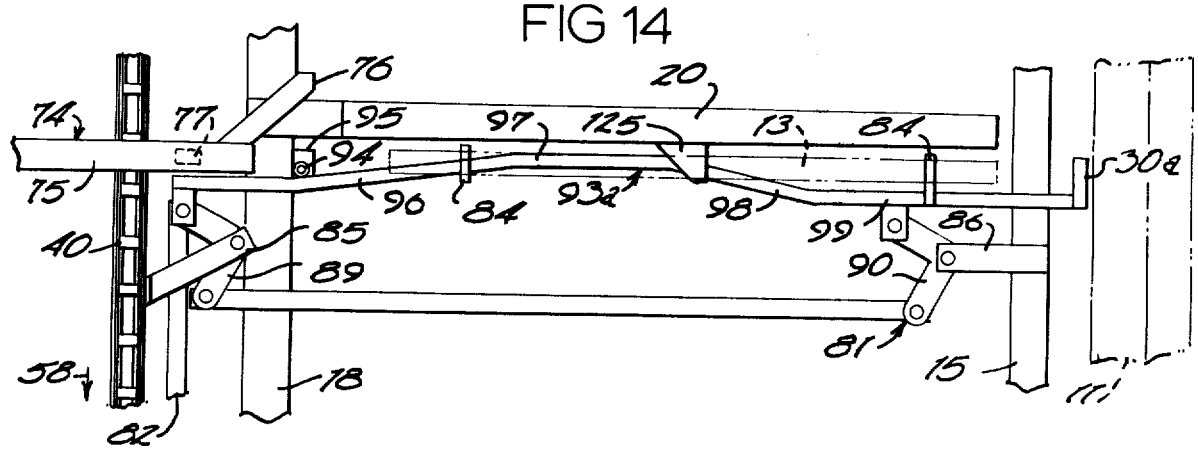
FIGS. 14-16 are fragmentary plan views illustrating operation of the sticker unloading means and stripping members.

Stickers utilized in the lumber industry for separating layers of boards are generally elongated slats having rectangular cross sections. The stickers are positioned between the layers of boards during the formation of a stack of lumber. Several stickers designated in the drawings by the numeral 13, are generally placed between each layer as the stack is being formed. The stickers separate the layers to enable the entire stack to be evenly dried in a kiln to prevent or minimize subsequent warping or shrinkage of the individual boards.

A stacking apparatus 10 is illustrated in FIGS. 2 and 7-9 that is designed to automatically form a stack 11 of a plurality of layers 12 of boards. The stacking apparatus principally includes a layer handling means 14 supported by an upright frame 15.

Frame 15 includes a plurality of upright front stationary and movable stripping members 30, that serve as vertical side alignment means for one side of the stack 11. The frame 15 also includes a horizontal support table 31 that initially supports the boards received from a feed conveyor 28. The layer handling means 14 includes a movable fork lift frame 16 for successively lifting layers of boards from the horizontal table 31 and moving the layers of boards over the top of the stripping members 30, and then lowering the layer in front of the stripping members onto the stack. The movable fork lift frame 16 is then moved back between the front stripping members 30 to strip the layers of boards from the fork lift frame and onto the stack.

The layer handling means 14 of the stacking apparatus may best be seen with reference to FIGS. 10 and 11. The handling means basically comprises an elevationally stationary rolling carriage 17. Carriage 17 is movably mounted to the frame 15 by longitudinally spaced rollers 19 (FIG. 10 and 11). The rollers 19 facilitate free translational movement of the carriage forward and rearward by a crank arm 24 that is driven by a motor 26.

The fork lift frame 16 includes fork arms 20 which extend upwardly and forwardly of a lifting carriage 18 mounted on rolling carriage 17. Forks 20 are mounted to vertically movable carriage 18 for movement therewith as initiated by a cam 23 and follower 22. The cam follower 22 depends from carriage 18 as shown in FIGS. 7–9. Cam 23 is pivotably mounted to a depending bracket 17a of carriage 17 and is connected to the crank arm 24. Rotation of the crank arm 24 as seen in FIGS. 7, 8 and 9 serves to (1) reciprocate the carriages 17 and 18 backward and forwardly along the frame 15 and (2) simultaneously operate cam 23 against the follower 22 to alternately raise and lower the lifting carriage 18. This operation is shown in FIGS. 7–9 wherein the fork arms 20 are lifted by the driving cam 23 to pick up a course of boards from the table 31 and more it to an outward position above the stack as shown in FIG. 8. The course is then lowered on the arms as the cam 23 allows the follower 22 and fork arms 20 to move downwardly. The carriage 17 is then retracted with the forks 20 in the down position as shown in FIG. 9 to strip the course from the forks and onto the stack.

The lifting carriage 18 is mounted to the rolling carriage 17 by means of a parallelogram-type linkage 21 that may best be seen in FIGS. 10 and 11. Linkage 21 allows the fork arms 20 to be lifted vertically upward and downwardly. This provides positive means for lifting and lowering the layers.

The stacking apparatus as described thus far in general is described in more detail in my pending United States application Ser. No. 214,727, filed Jan. 3, 1972, now U.S. Pat. No. 3,737,052, which is incorporated herein by reference.

The primary feature of my invention is the sticker placing apparatus which is utilized as an integral part of the above stacking machine. The sticker placing apparatus basically includes a sticker handling means, which is operable to place stickers under successive layers as they are delivered to the stack, in response to operation of the layer handling means. The sticker handling means is comprised of a single sticker magazine 35 and a sticker distribution means. The distribution means is operated to move stickers in successive incremental movements from the magazine across the stacking machine to unloading stations 37 where the stickers are unloaded. A supporting and holding means is also operated in response to the layer handling means to place the unloaded stickers against the undersides of successive layers of boards 12 on table 31 as the boards are lifted and moved forwardly to selected sticker positions on the stack.

Figure 17:
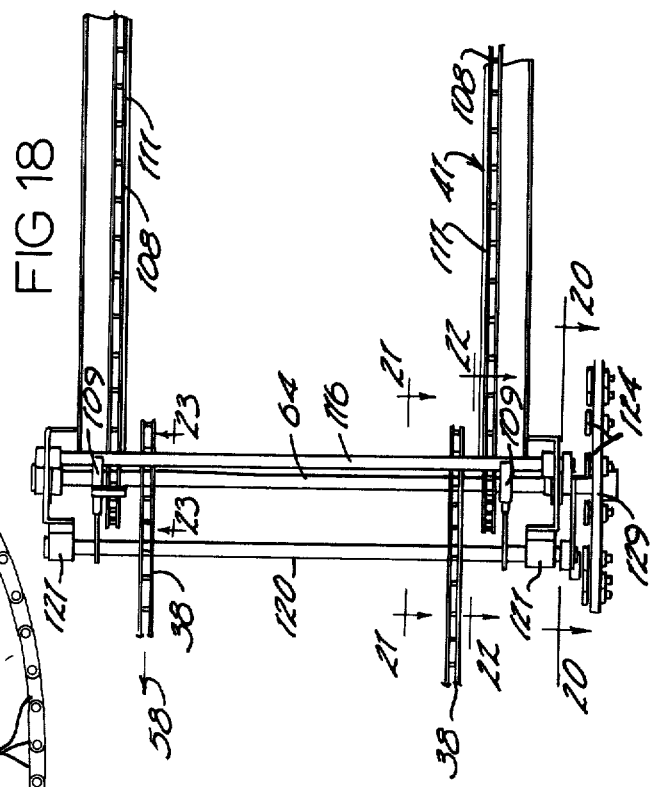
FIG. 17 is a fragmentary elevational view of an alternate form of the magazine and conveyor loading means of the present invention.
Figure 18:
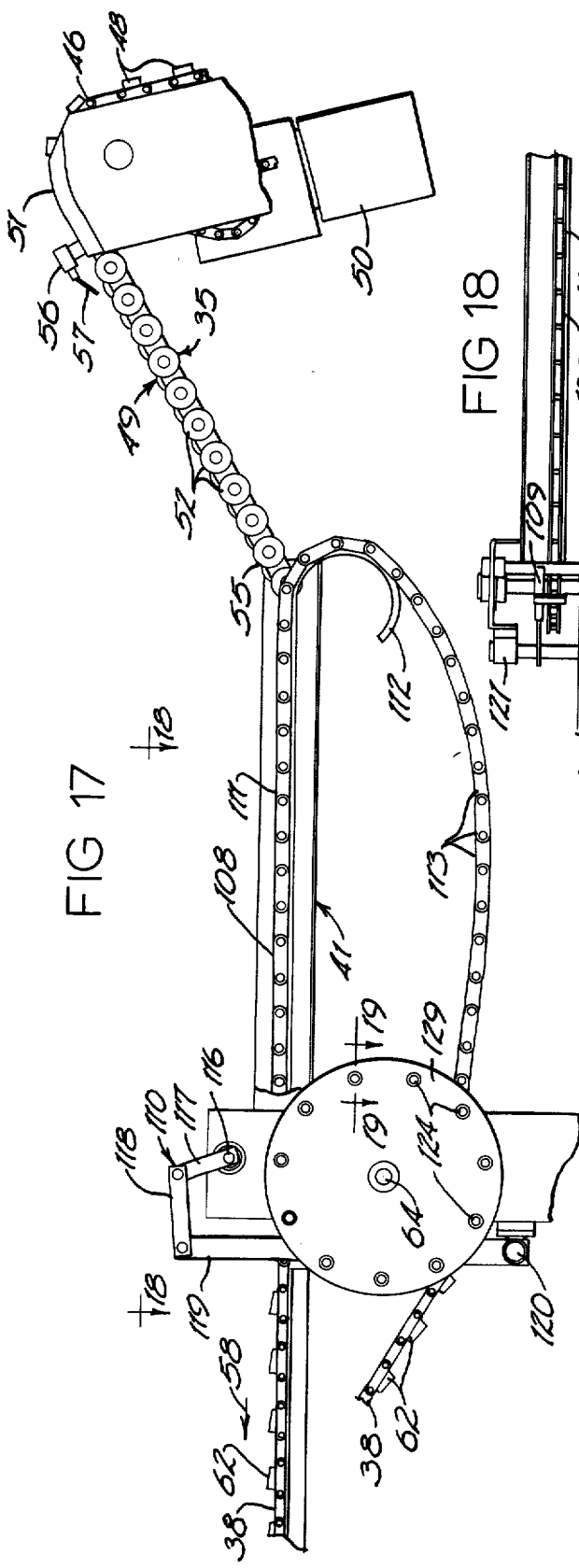
FIG. 18 is a plan view of the alternate magazine and conveyor loading means taken along line 18—18 in FIG. 17.
Figure 19:
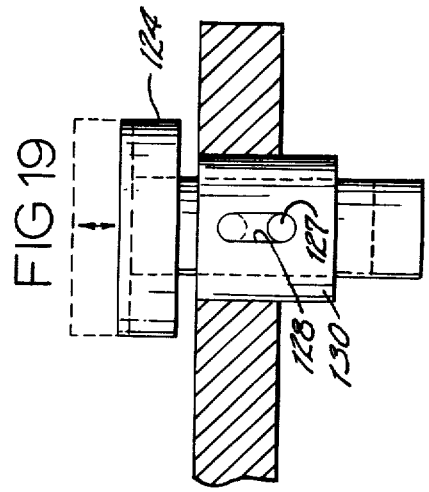
FIG. 19 is a sectioned view taken along line 19—19 in FIG. 17.

The single magazine 35 of the preferred embodiment is located at one longitudinal side of the stacker and includes a hopper 45 for storing a plurality of stickers 13 in a random array. An upright unscrambling conveyor means 46 is powered to move through the stickers in the hopper to unscramble and lift successive stickers therefrom to a guide chute 49 as shown in FIG. 3 or in an alternate form in FIG. 17.

The unscrambler conveyor is comprised of transversely spaced endless chains 47 that are connected across the conveyor by spaced elongated unscrambler bars 48. Bars 48 are spaced apart along the conveyor a distance somewhat greater than the width of the stickers 13. The conveyor is powered by a drive motor 50 to move a working flight upwardly through the hopper 45. The unscrambler bars 48 move upwardly with the working flight past a tangential guide track 51 at the upper end of the conveyor 46. Stickers carried on the bars 48 are transferred to the tracks 51 which lead to the downwardly inclined guide chute 49.

Stickers 13 received by the tracks 51 slide gravitationally downwardly along the guide chute 49. The guide chute of the preferred form is comprised of an upper and lower set of guide bars 54 and 53 respectively. The guide bars are spaced apart a distance slightly greater than the thickness of the stickers 13 to prevent them from turning sideways or falling from the guide chute 49. In the alternate form (FIG. 17) the chute 49 is simply comprised of an inclined race of rollers 52.

The guide chute 49 includes a lower end 55 which is positioned adjacent a conveyor loading means 41 of the sticker distribution means. The sticker distribution means is continuously supplied with stickers through operation of the magazine 35. This is accomplished by a time delay limit switch 56 (FIGS. 3 and 17) which is operatively connected to the drive motor 50. The limit switch 56 is mounted to the framework and includes a feeler arm 57 which extends toward the chute 49 to engage the stickers as they slide by. Once the chute becomes loaded with stickers 13 as shown in FIG. 3, the feeler arm 57 is held in an outward position. After a specified length of time, the limit switch is operated to deactivate the drive motor 50. When the top sticker moves down, the feeler arm 57 is again moved to an operative position and the motor 50 is started to activate the conveyor to supply stickers from the hopper to the guide chute 49.

Figure 21:
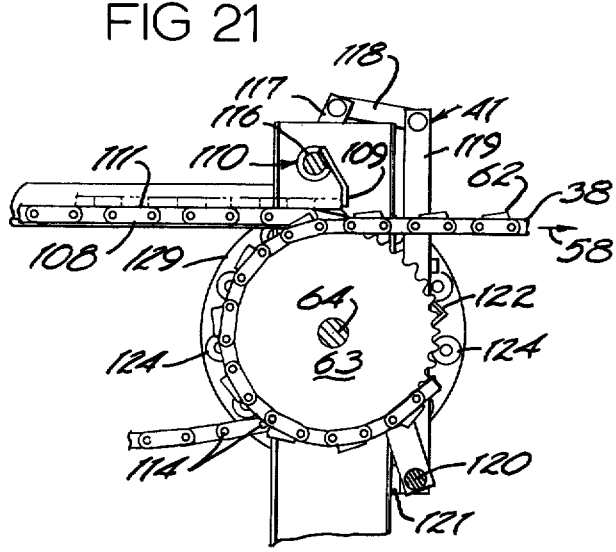
FIG. 21 is a sectioned elevational view taken along line 21—21 in FIG. 18.

The sticker distribution means includes an indexing conveyor means 40, which is formed of continuous elongated conveyor chains 38 powered about a course in the direction indicated by the directional arrow 58 by an indexing conveyor drive means 39 (FIG. 2). The conveyor chains 38 include spaced lugs 62 which are utilized to receive stickers from the magazine through operation of the conveyor loading means 41. The conveyor chains 38 and lugs 62 guide the stickers to the sticker unloading stations 37. As shown in FIGS. 3, 4, and 21, the conveyor chains 38 pass around a pair of end sprockets 63 which are mounted on a rotatable shaft 64 adjacent the magazine 35. Stickers 13 held by guide chute 49 are directed against successive lugs 62 as the distribution means is operated in response to cyclical operation of the stacking means.

The conveyor loading means 41 is illustrated in two separate forms-the first form being shown in FIGS. 1–5. The second form is illustrated in FIGS. 17–23.

The stickers 13 are taken one by one from the guide chute by operation of finger members 67 which comprise the first form of the conveyor loading means 41. Finger members 67 are slidably mounted within sockets 68 which are in turn affixed to circular plates 70. Plates 70 are fixed to the shaft 64 for rotation in response to movement of indexing conveyor chains 38. The sockets are angularly spaced about the axis of shaft 64 and extend radially therefrom. Finger members 67 are releasably held within sockets 68 by means of pins 71 which extend through apertures 72 in the sockets and complementary apertures 73, 73a in the finger members 67. Finger members 67, when in an operative position, extend outwardly from the sockets a distance sufficient to engage the bottom sticker of a group held within the guide chute 49. The fingers may be selectively retracted by simply removing pins 71 and sliding the finger members 67 inwardly toward the shaft 64. The second aperture 73a in the finger members 67, may then be aligned with the apertures 72 in the sockets 68. The pins 71 may then be placed through the apertures 72 and apertures 73a to lock the pins in an inoperative position.

The number of extended fingers 67 corresponds to the number of stickers to be utilized between each layer of boards in a stack. By selectively retracting one or more of the fingers 67, the number of stickers between the layers may be varied as well as their spacing along the stack. This is an important feature and will be discussed in greater detail below.

Operation of the fingers may be viewed with reference to FIG. 3. As the indexing conveyor means is operated, the shaft 64 is rotated to move the finger members 67 past the open end 55 of the guide chute 49. As they are moved past the open end 55, the extended fingers 67 each engage a sticker of the group held within the guide chute and successively lifts it onto the conveyor means 40.

The conveyor loading means 41 of the second form is illustrated in FIGS. 17–24. In this form, the guide shute 49 leads downwardly to a sticker biasing means comprised of endless chains 108. Chains 108 are utilized to receive stickers from chute 49 and urge them against a pair of abutments 109 of an escapement release means 110. The chains 108 and the abutment 109 are operatively connected via shaft 64 to the indexing conveyor drive means to successively release stickers onto the indexing conveyor chains 38 as it is indexed forwardly.

Figure 23:
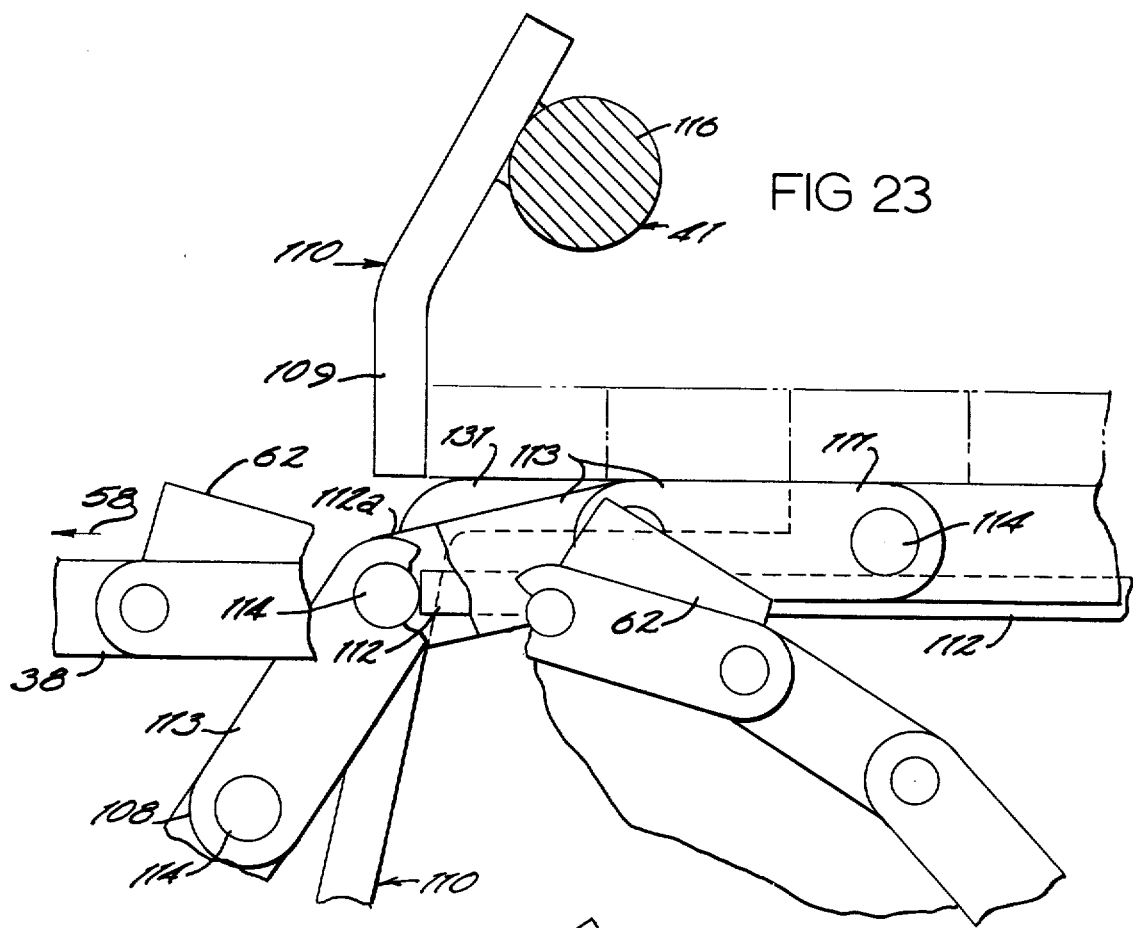
FIG. 23 is an enlarged fragmentary diagrammatic view illustrating the operation of the alternate form of the conveyor loading means.
Figure 24:
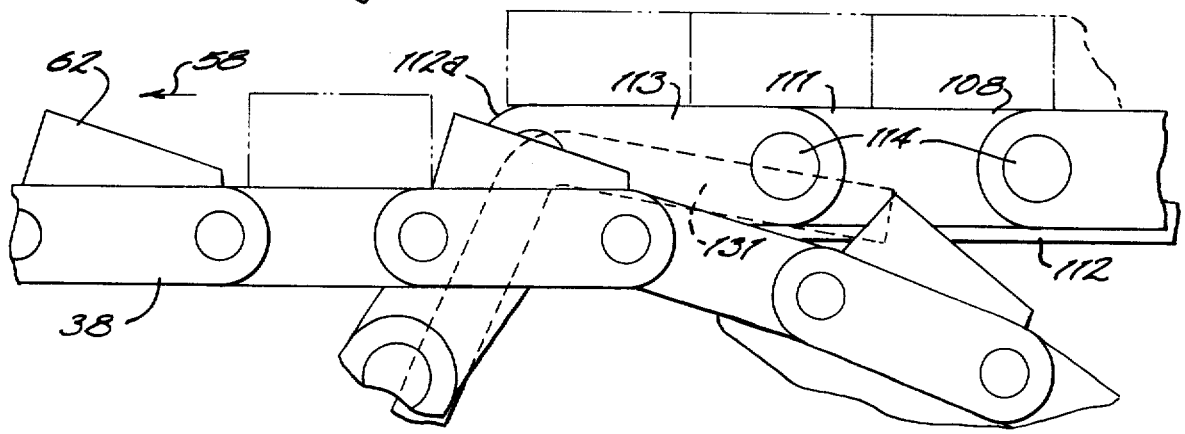
FIG. 24 is a view similar to FIG. 23 only showing a different operational position of the alternate conveyor loading means.

The chains 108 include working flights 111 that extend forwardly from the end 55 of chute 49 to discharge ends 112a (FIGS. 23 and 24). A parallel pair of chain races 112 carry the working flights at an elevation slightly greater than the elevation of indexing conveyor chains 38 and locate the discharge ends 112a at a position overlapping the adjacent end of indexing conveyor chains 38 (FIG. 21). The chains 108 are comprised of a plurality of interconnected links 113. Each link 113 includes a length between inter-connecting rollers 114 greater than the width of a typical sticker.

The chains 108 extend from the discharge end 112a downwardly to engage sprockets 115 (FIG. 22) mounted to shaft 64. Thus, as the shaft 64 rotates in response to the indexing conveyor drive means, the chains 108 are simultaneously powered to move forwardly.

Figure 22:
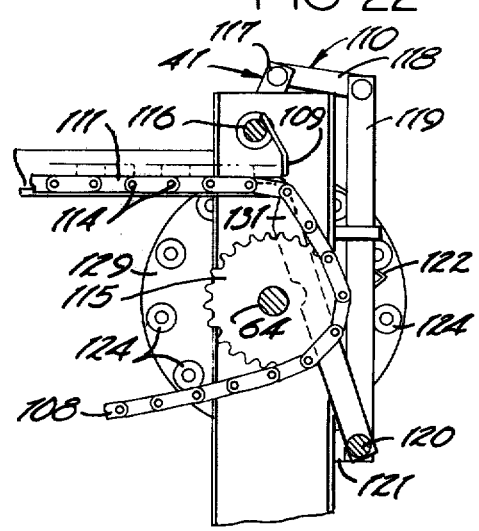
FIG. 22 is a sectioned elevational view taken along line 22—22 in FIG. 18.

Abutments 109 are elements included in the escapement release means 110 which also operates in response to the indexing conveyor drive means. The abutments 109 are fixed to a horizontal pivot shaft 116 pivotably carried on the framework 15. In a closed position as shown in FIGS. 21, 22 and 23, the abutments project downwardly into the paths of the stickers carried on the working flights 111 of chains 108. The abutments are pivoted clear of the path to an open position by a cam and follower arrangement shown in FIG. 20 to enable loading of the indexing conveyor means 40.

The pivot shaft 116 includes a crank arm 117 extending radially from one end thereof. The crank arm 117 is pivotably mounted to an intermediate linkage member 118. The linkage member then is pivotably mounted to the upper end of a follower support bar 119. A second pivot shaft 120 pivotably mounts the follower support bar 119 and is carried by bearings 121 on the framework 15.

Figure 20:
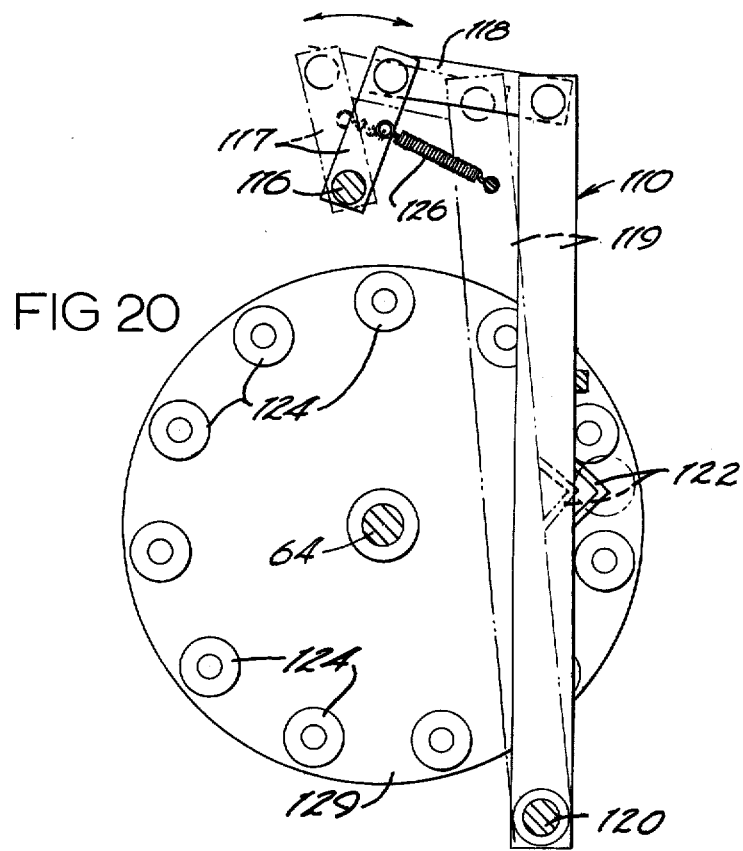
FIG. 20 is an enlarged sectioned elevational view taken along line 20—20 in FIG. 18.

A follower 122 is fixed to the follower support bar 119 that, when engaged by a cam 124, pivots the follower support bar between the angular positions illustrated in FIG. 20 by solid and dashed lines. The pivot shaft 116 then also pivots in response to pivotal movement of the bar 119. Pivotal movement of the shaft 116 causes the abutments to be pivoted between the angular positions illustrated in FIGS. 23 and 24. The open position of the abutments shown in FIG. 24 allows stickers held on the chains 108 to be transferred to the indexing conveyor chains 38.

Movement of the abutments 109 between the angular positions is selectively controlled to sequentially transfer a number of stickers onto indexing conveyor chains 38 equal to the selected number of stickers to be utilized between each layer on the stack. This is accomplished by a series of roller cams 124. The number of cams 124 utilized corresponds to the selected number of sticker positions between each layer of boards. Cams 124 are rotatably mounted on a circular plate 129. The plate 129 is then fixed to the shaft 64 for rotation therewith. Cams 124 are mounted at equal radii and at equal angular intervals about the plate for rotational movement about the axis of shaft 64 in a prescribed circular path.

A tension spring 126 is utilized to urge the follower 122 into the circular path of the cams 124 so each cam will actuate the abutments to pivot between the positions shown in FIGS. 23 and 24 as it rotates in response to movement of the indexing conveyor chains 38.

The cams may be selectively moved out of the circular path to inoperative positions by selective operation of a cam positioning means provided for each cam 124. The cam positioning means is illustrated in detail in FIG. 19 and simply comprises pins 127 mounted to each cam, and slots 128 for receiving the pins 127. The slots 128 are formed in sleeves 130. The sleeves 130 are mounted to the plate 129. Slot 128 allows the cam to be selectively moved in or outwardly from the plate 129. The inward position of the cam (FIG. 19 solid lines) is an inoperative position wherein the cam rotates freely with shaft 64 without engaging follower 122. The outward position of the cam (FIG. 19 dashed lines) is an operative position wherein the cam lies within the selected circular path and will engage the follower 122 once for each revolution of the shaft 64.

The adjustment feature of the cams 124 is utilized to select a desired number and/or spacing of stickers between each layer and will be discussed in greater detail below.

In operation, the chains 108 receive a steady supply of stickers from the magazine 35. The stickers are moved along the working flight 111 toward abutments 109 as the chains move in response to rotational movement of shaft 64. Once the leading sticker comes into contact with the abutments 109, it is held stationary along with the remaining stickers behind. The chains then slide beneath the stickers until the abutments 109 are operated to open.

It should be noted at this point that the position of the chain races 112 described above cause the chain to move in a jerking motion to maintain a bias of the stickers against the abutments 109. This effect is achieved by spacing the races 112 a radial distance from the axis of sprocket 115 greater than the radius of the sprocket.

As the sprockets 115 pull the chains from the ends of races 112, the forward roller 114 of each link moves over the end of a race 112. A slack is thereby created between the chains 108 and sprockets 115 which must be taken up before the chains can be moved forwardly again. It is during this slack that the abutments 109 are operated to move to an open position, allowing a sticker to move onto the indexing conveyor chains 38.

The movement of the abutments 109 is timed so that they remain in the open position as the link 113 supporting the forward sticker tilts downwardly toward the sprockets 115. The sticker then slides down the link and onto the indexing conveyor chains 38 as shown in FIG. 24. When the sticker reaches chains 38 the abutment 109 moves back into the path of the next sticker to hold it stationary until the next successive cam 124 forces it to open again.

A secondary support member 131 is provided as shown in FIGS. 22, 23, and 24 to hold the forward sticker elevationally above the lugs 62 until follower 122 is engaged by a cam 124. Support member 131 is mounted to the second pivot shaft 120 for simultaneous movement with the abutments 109. The inoperative and operative positions of member 131 are shown in FIGS. 23 and 24 respectively.

The indexing conveyor means 40 shown in the drawings is powered to operate intermittently to deliver eleven stickers onto the conveyor chains 38 in response to each operational cycle of the layer handling means 14. This is accomplished by controlled operation of the indexing conveyor drive means 39 (FIG. 2). Drive means 39 is automatically activated to index the conveyor chains 38 forwardly after the fork arms 20 are raised to engage and lift a layer of boards from the support table 31. A conventional limit switch (not shown) positioned on the frame 15 that is tripped to activate the drive means 39 as the fork arms 20 reach a fully raised position as shown in FIG. 11. During each cycle of the stacking machine, the drive means 39 rotates the shaft 64 one revolution to remove the same number of stickers as there are extended fingers 67 or operative cams 124, from the magazine and distribute the stickers on the conveyor means 40.

The distribution means further includes a conveyor unloading means 74 for removing stickers 13 from conveyor means 40 at the unloading stations 37. The unloading means 74 comprises elongated inverted channels 75 held by upright supports 76 which are fixed to carriage 17. The elongated channels 75 extend elevationally over the conveyor 40 to overlap stickers at the unloading stations 37. Directly below the elongated channels 76 are upright posts 77 which are mounted to carriage 18. The posts 77 include spring-loaded upper end sections 80 which serve to engage the stickers at the unloading stations as the lifting carriage 18 is raised as shown in FIG. 11. The stickers at the unloading stations are engaged by the spring-loaded end sections 80 and lifted upwardly against the elongated channel 75. The springs compress in the end sections 80 to hold the stickers firmly against the channels 75 as the carriage is moved forwardly by the driving motor 26.

The stickers are carried by the unloading means 74 to intermediate positions 83 located between the indexing conveyor means 40 and the stack 11. The stickers are released from the channels and upright posts 75, 77 at the intermediate positions 83 as the lifting carriage 18 is lowered, bringing the fork arms 20 down onto the stack.

The stickers are received and supported at the intermediate positions by spaced support members 84, each mounted on a support assembly 81. Support members 84 hold the stickers at horizontal positions in the vertical paths of laterally protruding brackets 125 on the fork arms 20. Brackets 125 constitute elements of supporting and holding means for engaging and moving the stickers onto the stack.

The brackets 125 engage stickers at the intermediate positions as the fork arms 20 are raised to lift a layer of boards 12 from support table 31. As the fork arms are raised, the brackets engage the stickers and lift them toward the underside of the layer 12 above. The brackets are positioned on the arms so that the stickers may engage the underside of the layer and clamp the sticker between the layer 12 and brackets 125.

The fork arms are moved forwardly to the position shown in FIG. 8 to locate the stickers and the layer 12 over the stack. Cam 23 then allows the fork arms to move downwardly onto the stack and subsequently retract in the lowered position, moving the layer and stickers against stripping members 30 and movable stripping members 30a positioned in the rearward path of the stickers on the stack.

Stripping members 30a are mounted at the front ends of the same support assemblies 81 that mount the intermediate support members 84. As the arms are retracted, the stickers engage the stripping members 30a and are thereby prevented from further rearward movement.

The arms, however, continue to retract with brackets 125 sliding below the stickers. As the brackets move rearwardly, the stickers are sandwiched between the stack and the layer 12 (FIG. 8). The stripping members 30a are then moved laterally out of the rearward path of the brackets 125.

Figure 15:
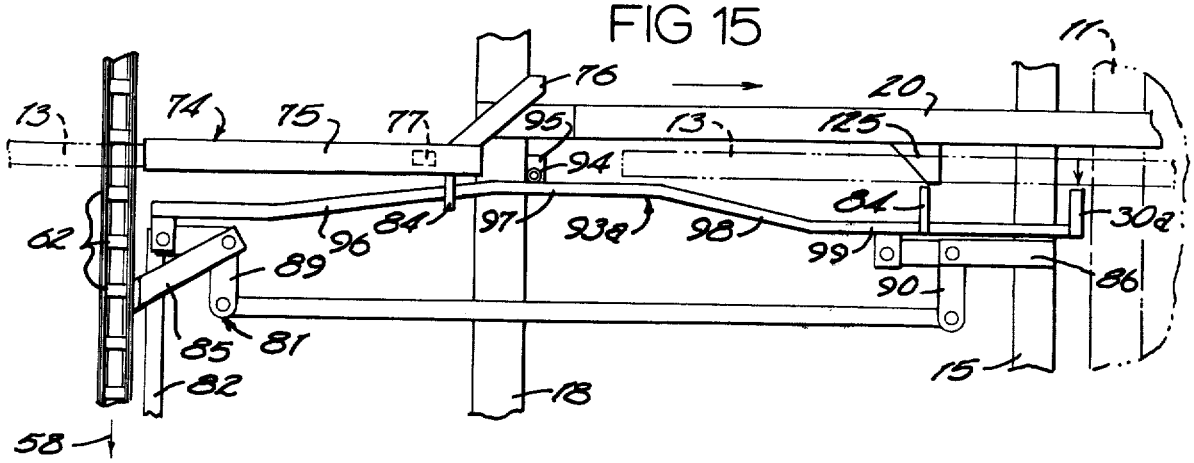
Figure 16:
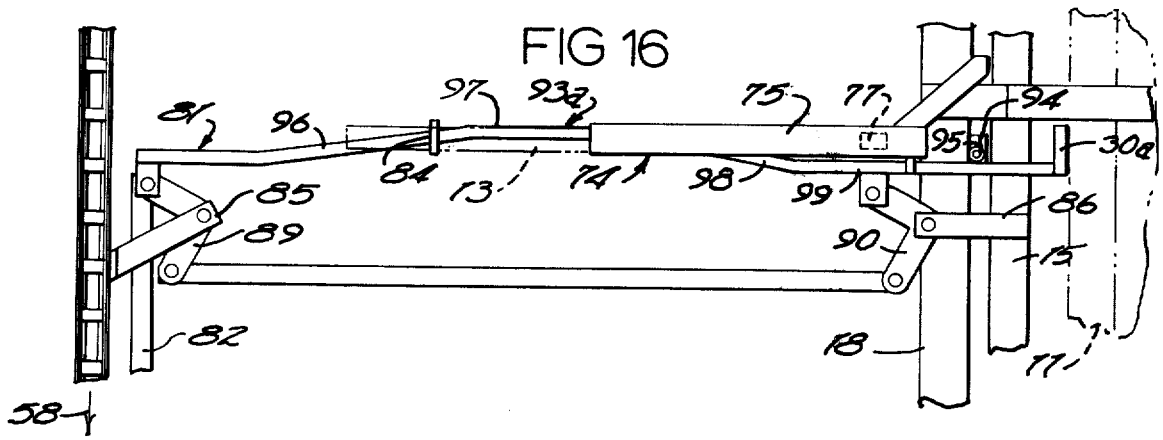

The support assemblies 81 are mounted on the frame at spaced intervals corresponding to the sticker positions for lateral movement during the forward and rearward strokes of the forked arms (FIG. 1). One assembly 81 is utilized for each sticker held at an unloading station 37. Each assembly 81 is pivotably mounted on frame 15 by a rear mounting bracket 85 and a front bracket 86. Brackets 85 and 86 pivotably mount a rearward crank arm 89 and a forward crank arm 90 respectively. The crank arms 89, 90 are connected together on one side by an elongated bar 93 to which the support members 84 and a stripping member 30a is mounted (FIGS. 14–16).

Crank arms 89, 90 allow the bar 93 and members 84 and 30a to be pivoted into and out of the path of the post 77 and bracket 125, as the layer handling means is moved forwardly and rearwardly. This pivotal movement is transferred simultaneously to each support assembly 81 by a common connecting bar 82 (FIGS. 1, 14–16) which extends transversely across the frame and is pivotably connected to rear crank arms 89 of each assembly 81.

Pivotal movement of the support members 84 and stripping members 30a is initiated by means of an elongated cam 93a and a follower 94. Cam 93a is formed from one of the bars 93 at one end of the common connecting bar 82. The follower 94 is mounted to an upright post 95 which is fixed to the rolling carriage 17. The follower 94 is held by post 95 against one side of the cam 93 so that as the carriage 17 is moved forward and backward, the follower will move along the length of the cam to shift it laterally.

Cam 93a includes a first inclined face section 96, a second flat section 97, a third inclined section 98 and a fourth flat section 99.

As the carriage moves forwardly, the follower moves against the first inclined section 96 to shift the supports 84 out of the forward path of the upright posts 77 of the unloading means. The follower moves over the second flat section 97 as the carriage continues to move forwardly. During forward movement, the flat section 97 serves to hold the supports 84 out of the forward path of the posts 77. As the carriage continues to move forwardly, the follower 94 moves along the third inclined section 98 which is inclined oppositely to the first section 96. Section 97 allows the supports to shift back into the path of posts 77 to receive stickers as carriage 18 is subsequently lowered. It also serves to position the stripping members 30a directly behind the stickers held by brackets 125 on the stack prior to rearward movement of the carriage. The fourth flat section then allows the support members 84 to remain in position to receive stickers as the forward movement is completed and the carriage is lowered.

During rearward movement of the carriage, the follower 94 moves rearwardly along the fourth cam section 99 which then serves to hold stripping members 30a in the path of the stickers held by brackets 125. As the carriage continues to move rearwardly, the follower moves along the third cam section 98. The rearwardly moving follower 94 engages section 98 and forces the cam to move laterally, gradually shifting the stripping members 30a out of the paths of brackets 125. Continued rearward movement of the carriage brings the follower back over the second flat surface 97 and along the first inclined surface 96. As the follower moves along surface 96, the supports and stickers held thereby are shifted back to position the stickers above the brackets 125 for the next operational cycle.

An alternate form of the conveyor unloading means 74 is illustrated in FIGS. 12 and 13. In this form, the stickers are removed from the conveyor 40 by a kicker means shown generally at 135. The kicker means 135 comprises a number of flippers 136 mounted on a pivot shaft 137 adjacent the rearward ends of the stickers positioned at the unloading stations 37. The flippers are operated by a cylinder or solenoid 138 to pivot toward the front of the stacker as shown by the arrows in FIG. 13. As they are pivoted forwardly, the flippers engage the ends of the stickers and push them forwardly. The front ends of the stickers then slide up a guide plate 140 which is mounted to frame 15. The guide plate 140 directs the front ends of the stickers upwardly to be clamped between a spaced set of rollers 141 and a conveyor belt 142 powered by a motor 143. The belt 142 is powered by motor 143 to draw the stickers from the conveyor chains 38 and place them in elongated trays 144 mounted on table 31. The stickers are then free to be engaged by the brackets 125 and subsequently placed on the stack.

The stripping members 30a of the alternate form simply comprise a series of plates 145 (FIGS. 12, 13) hinged to the front of frame 15. The plates are positioned across frame 15 so that they may be selectively pivoted into and out of the rearward path of brackets 125. Such pivotal movement is initiated by operation of a cylinder or solenoid 146 connected between frame 15 and a crank arm 147 on the hinged plates 145. Timed operation of the cylinder or solenoid may be accomplished by conventional switching means (not shown).

The operation of the present invention with particular emphasis on the movement of the indexing conveyor may now be clearly understood from the foregoing description and the attached drawings.

As previously described, the magazine 35 receives stickers in an unsorted array from the hopper 45. The unscrambler conveyor 46 moves stickers from the hopper to the guide chute 49. The drive motor 50 is operated by limit switch 56 independently of the remainder of the apparatus to keep the guide chute full of stickers.

Stickers are removed from the magazine by the conveyor loading means 41 and distributed between successive lugs 62 on the indexing conveyor means 40 upon each operational cycle of the stacking machine. The number of stickers placed on indexing conveyor chains 38 upon each operational cycle of the stacking machine is equal to the number of stickers to be positioned between each successive layer of boards. To accomplish this, the conveyor loading means 41 is adjusted so that the number of extended operative fingers 67 or operative cams 124 is equal to the number of stickers to be delivered to the conveyor 40.

The proper number of stickers to be placed between adjacent layers is dependent upon two factors — the length of the boards to be stacked, and the desired spacing between stickers on the stack. The stacking apparatus shown in the drawings is capable of stacking boards of lengths up to 20 feet. When stacking 20 foot boards, it is usually desirable to space stickers at 2 foot intervals along the length of the boards between successive layers. With 20 foot boards and 2 foot sticker spacing — 11 stickers would be required between each layer. Thus, for purposes of stacking 20 foot boards, all 11 fingers 67 or cams 124 of the conveyor loading means 41 are required to be in the extended, operative position. If, however, it were desirable to utilize the machine to stack 10 foot boards with a sticker placed every 2 feet along the length of each layer, then five cams 124 or fingers 67 could be retracted to the inoperative position, leaving six extended.

It may be noted that the spacing between the stickers in the stack may be varied by selectively retracting the proper fingers 67 or cams 124.

In order to move sets of stickers in successive incremental movements along the indexing conveyor and deposit at least one sticker at each unloading station for each cycle, a specific relationship must exist between the spacing of the unloading stations, corresponding spacing between lugs on the indexing conveyor, and the lengths of index increments. This relationship may be variable in terms of these three factors to determine in what manner the stickers are to be progressively moved along to each unloading station.

For example, I have found that if the unloading stations are spaced apart equally and the index increments are to be equal, then the corresponding lug spacing must be equal. Therefore, in stacking 8 foot boards such a 2 × 4 studs, with five stickers to be evenly spaced on 2 foot centers along each layer, a common lug space of 4 inches along with equal index increments of 44 inches may be utilized.

If unequal spacing between stickers along the layers of a stack is desired, utilizing equal index increments of the conveyor, then the spacing between successive lugs must vary correspondingly with the spacing between unloading stations. If, for example, in stacking 12 foot boards it is desirable to place four stickers on 43, 48 and 47 inch centers along with a constant indexing distance of 38 inches, then corresponding spaces between conveyor lugs must be 5, 10 and 9 inches respectively. The above lug spaces are easily found by subtracting the indexing distance from the successive spaces between unloading stations, i.e. 43−38 = 5, 48−38 = 10, and 47−38 = 9.

It is understood that the above results could also be obtained by utilizing equal lug spacing and varying the index increments. However, a more complex control system would then be required.

It has been found through experimentation that 20 foot boards may be stacked with 11 stickers spaced at equal 2 foot intervals along successive layers, utilizing equal conveyor lug spacing of 4 inches and index intervals of 44 inches. FIG. 6 is a diagrammatic example of a machine for stacking boards of lengths up to 20 feet that utilizes such lug spacing and index distances. For purposes of explanation, the progression of one set of stickers is shown in steps ($S_1$ through $S_{11}$), from its initial placement onto the conveyor ($S_1$) to the step ($S_{11}$) of placing the last sticker at the last unloading station. The individual stickers of the set are labeled with the letters A through K and individual stacking stations are labeled 37a through 37k.

In the first step ($S_1$), the set of stickers A–K are loaded from the magazine onto the index conveyor chains 38, with lug spacings of 4 inches and with sticker A positioned at unloading station 37a and sticker G at unloading station 37b. At step $S_2$ then, the unloading means is operated to remove stickers A and G from the conveyor and place them at corresponding intermediate sticker positions 83.

In Step $S_3$, the remaining stickers B, C, D, E, F, H, I, J, and K are moved another 44 inches, bringing stickers B and H to unloading stations 37c and 37d respectively. This step also loads a second successive set of eleven stickers onto the conveyor from magazine 35.

During step $S_4$, stickers B and H are removed from the conveyor chains by the unloading means, and placed at corresponding intermediate positions 83.

During step $S_5$, the conveyor chains 38 index the remaining stickers C, D, E, F, I, J, and K an additional 44 inches to align sticker C with unloading station 37e and sticker I with unloading station 37f.

During step $S_6$ the stickers C and I are removed by the unloading means and placed at respective intermediate positions.

In step $S_7$ the indexing conveyor chains are moved yet another 44 inches, bringing the remaining stickers D, E, F, J and K to positions where sticker D is aligned with unloading station 37h and sticker J is aligned with station 37h. During step $S_8$, the stickers D and J are removed from the indexing conveyor chains 38 and transported to the intermediate locations in anticipation of being placed between layers.

The indexing conveyor chains 38 are indexed another increment of 44 inches during step $S_9$ to move the remaining stickers, E, K and F forward to positions wherein sticker E is located at unloading station 37i and sticker K is located at unloading station 37j. In the subsequent step $S_{10}$, the unloading means removes the stickers E and K from the indexing conveyor and places them at respective intermediate positions.

Finally, in step $S_{11}$ the last remaining sticker F is indexed forward 44 inches to unloading station 37k where it is removed from the indexing conveyor chains, placed at an intermediate position, and subsequently placed under a layer of boards and moved onto the stack.

The stickers are lifted from the intermediate positions 83 by the brackets 125 up against the overlying layer and transported to the stack to separate the overlying layer from the preceding layer.

It should be understood that the above described operation was given by way of example to show the progress of a single set of 11 stickers along the indexing conveyor. It should also be understood that the set described was picked from a continuous series suppliied to the conveyor from the magazine. Thus, each unloading station receives a sticker for each incremental movement of the indexing conveyor.

If, instead of 20 foot boards, it was desirable to utilize the machine to stack 12 foot boards with stickers spaced every 2 feet, only seven stickers would be needed to be placed between each layer. To adjust the conveyor loading means to do this, the operator simply retracts the fingers 67 or cams 124 that would normally load stickes, J, E, K and F onto the conveyor. Further, if 48 inch spacing between stickers and only four stickers were desired between each layer of 12 foot boards, the fingers or cams that would normally load stickers G, H, I, J, E, K, and F could be retracted.

The operation of the indexing conveyor is timed in relation to the operation of the layer handling means to supply stickers to each unloading station as the layer handling means begins forward motion. During this motion, the sticker unloading means is simultaneously operated to engage stickers previously placed at the unloading stations and move them toward the intermediate positions. As this is happening, the fork arms 20 are simultaneously being raised, moving the brackets 125 upwardly to lift stickers previously deposited at the intermediate positions against the lower surface of the layer 12 presently on table 31 above. Then, as the fork arms reach a fully raised position, the layer 12 and stickers 13 held by brackets 125 are moved forwardly along with the stickers 12 held between channel 75 and post 77 of the conveyor unloading means (FIGS. 7 and 11). Upon reaching a full forward position (FIG. 8) the cam 23 allows the arms 20 to be lowered toward the stack. As the arms are lowered, the channels 75 and posts 77 move apart, releasing the stickers held thereby onto the supports 84 at the intermediate positions. Finally, the arms are retracted, stripping the layer 12 and stickers therewith onto the stack (FIG. 9). As the layer handling means moves rearwardly so does the conveyor unloading means, toward the stickers freshly supplied to the unloading stations by the indexing conveyor, to begin the next operational cycle of a continuous series.

The operation of the conveyor unloading means of the alternate form is operated as described in sequence with the layer handling means to supply stickers to the intermediate positions while the layer handling means is moving to or from a forward position.

It may become obvious upon reading the above description along with the accompanying drawings that various changes and modifications may be made therein without departing from the intended scope of the invention. Therefore, only the following claims are intended to define the invention.

What I claim is:

1. In combination with stacking means for delivering and depositing successive layers of lumber on a stack of lumber; sticker placing apparatus for placing stickers crossways between successive layers of boards at desired sticker intervals along the length of the lumber to vertically separate the layers in the stack, comprising:

a single magazine storing a plurality of stickers responsive to the stacking means;

sticker distribution means responsive to the stacking means for successively removing the stickers from the single magazine distributing the stickers in coordination with the stacking means to sticker positions spaced according to the desired sticker intervals; said sticker distribution means comprising;

an elongated endless indexing conveyor extending substantially parallel with the lumber between spaced sticker unloading stations corresponding in number and spacing to the sticker positions, in which the indexing conveyor has a sticker receiving end;

and indexing conveyor loading means for depositing a set of stickers equal to the number of sticker positions crosswise on the receiving end of the indexing conveyor during each cycle of operation of the stacking means of placing a layer of boards on the stack, in which the stickers are deposited on the indexing conveyor with the center-to-center distance between adjacent stickers of the set being less than the spacing between adjacent sticker positions; and indexing drive means operatively connected to the indexing conveyor for intermittently driving the conveyor forward an incremental distance related to the spacing between the stacking positions during each cycle of operating of the stacking means to incrementally and progressively move the set of stickers sequentially from the receiving end of the conveyor to downstream unloading stations during successive cycles of operation.

2. The invention as defined in claim 1 wherein the indexing conveyor has sticker lugs thereon spaced at intervals equal to the center-to-center distance between adjacent stickers.

3. The invention set out in claim 2 wherein the distance between adjacent sticker lugs added to the conveyor incremental distance equals the distance between corresponding adjacent sticker positions, or a multiple thereof.

4. The invention set out in claim 1 wherein the distribution means further includes unloading means for removing the stickers from the indexing conveyor means at the unloading stations and positioning the stickers at the sticker positions.

5. The invention set out in claim 4 wherein the distribution means further includes sticker supporting and holding means for supporting and holding the unloaded stickers against the underside of the successive layer as the layer is being deposited on the stack to vertically space the deposited layer from the preceding layer of the stack.

6. The invention set out in claim 4 wherein the unloading means includes:

a sticker receiving channel, operatively connected to the stacking means for movement therewith, positioned elevationally above each of the sticker unloading stations on the indexing conveyor means; and an upright post operatively connected to the stacking means for movement therewith at a position elevationally below each of the sticker receiving channels.

7. The invention set out in claim 6 wherein the apparatus further includes sticker supporting and holding means for supporting and holding the unloaded stickers against the underside of the successive layer as the layer is being deposited on the stack to vertically space the deposited layer from the preceding layer of the stack.

8. The invention set out in claim 4 wherein the unloading means comprises kicker means positioned at respective unloading stations and operatively connected to the stacking means for engaging rear ends of the stickers and pushing the stickers endwise toward the stack in response to operation of the stacking means;

conveying means for receiving the stickers from the kicker means and operable in response to operation of the stacking means to move the stickers toward the stack.

9. The invention set out in claim 8 wherein the apparatus further includes sticker supporting and holding means for supporting and holding the unloaded stickers against the underside of the successive layer as the layer is being deposited on the stack to vertically space the deposited layer from the preceding layer of the stack.

10. The invention set out in claim 1 wherein the conveyor loading means includes:

a plurality of spaced finger elements movably mounted along a path extending between the magazine and the indexing conveyor means, the number of the fingers corresponding to the number of selected sticker positions; and drive means for movng the fingers past the magazine to the conveyor means to remove the selected number of stickers, during each cycle of operation of the stacking means in which a layer of lumber is delivered and deposited on the stack.

11. The invention as set out in claim 10 wherein the magazine comprises:

sticker hopper means for receiving stickers in an unsorted array;

a sticker unscrambler conveyor means extending from an infeed end within the hopper upwardly to an output end elevationally above the hopper, for receiving and delivering stickers in a parallel, oriented relationship successively to an elongated guide chute;

the guide chute having an upper open end adjacent the output end of the unscrambler conveyor means to loosely receive stickers therefrom and a lower open end adjacent the path of the fingers, the guide chute being downwardly inclined from the output end of the unscrambler means to allow stickers received from the unscrambler conveyor to slide gravitationally toward the lower end thereof;

the lower open end of the chute being positioned adjacent the fingers and in the path of the fingers, whereby the individual fingers moving along said path each engage a sticker at the lower open end of the chute and move it onto the indexing conveyor means.

12. The invention set out in claim 10 further comprising adjusting means for selectively retracting or extending the fingers into or out of the path to facilitate selective spacing of the stickers on the indexing conveyor means.

13. The invention set out in claim 1 wherein the conveyor loading means comprises:

escapement release means including a movable abutment overlapping the one end of the indexing conveyor means, the escapement release means being operatively connected to indexing conveyor means and operable in response thereto for sequentially releasing a number of stickers equal to the selected number of sticker positions onto the indexing conveyor means during each cycle of operation of the sticking means; and biasing means for receiving stickers from the magazine and urging the stickers against the movable abutment.

14. The invention set out in claim 13 wherein the biasing means comprises:

an endless chain;

a sprocket operatively connected to the indexing drive means for rotation about an axis in response to movement of the elongated endless conveyor;

the chain being mounted to the sprocket and including a working flight extending along a from the magazine to a discharge end overlapping the one end of the elongated endless conveyor;

the working flight of the chain being supported at a radial distance from the axis a distance greater than the radius of the sprocket; and wherein the chain is comprised of interconnected links, each of which includes a length greater than the width of a sticker.

15. The invention set out in claim 14 wherein the escapement release means further comprises:

a number of cams, equal to the number of selected sticker positions, operatively connected to the indexing drive means for movement about a prescribed path;

the cams being spaced apart by distances related to the spacing between the sticker lugs; and a cam follower mounted to the abutment and movably biased into the prescribed path of the cams whereby movement of the cams about the prescribed path causes movement of the cam follower and abutment to successively release stickers from the discharge end of the chain onto the elongated endless conveyor.

16. The invention set out in claim 15 further including cam positioning means for enabling each cam to be selectively moved to an inoperative position clear of the prescribed path.

17. A lumber stacking apparatus for forming a stack of boards having a plurality of layers of boards, in which each layer is spearated by transverse stickers, said apparatus comprising:

a. a frame;

b. stripping members on the frame facing forward;

c. a layer handling means movably mounted on the frame for sequentially lifting successive layers of boards from the frame, moving the layers in a forward path over the upright stripping members, lowering the layers in front of the stripping members, and retracting to move the layers against the stripping members to strip the layers from the layer handling means onto the stack;

d. a single sticker magazine mounted on the frame for storing a plurality of stickers;

e. an indexing conveyor means mounted on the frame for receiving stickers from the magazine and successively moving the stickers laterally along the stack to selected spaced sticker unloading stations rearward of the layer handling means;

f. unloading means for moving the stickers from the unloading stations to positions intermediate the indexing conveyor means and the stack at elevations below the successive layers received by the frame; and g. sticker supporting and holding means associated with the layer handling means for successively engaging the stickers at the intermediate positions and moving them upwardly against the bottom of a layer on the frame as the handling means moves to lift the layer from the frame.

18. The invention set out in claim 17 wherein the sticker supporting and holding means comprise brackets fixed to the layer handling means below the stickers at the intermediate positions and extending laterally from the handling means underneath the stickers at the intermediate positions.

19. The apparatus as defined in claim 17 further comprising:

a conveyor loading means operatively between the magazine and the conveyor means for removing a set of stickers from the magazine and depositing the set of stickers on the conveyor means during each cycle of operation of the apparatus of placing a layer of boards on the stack, in which the stickers are deposited on the conveyor with the center-to-center distance between adjacent stickers of the set being less than the desired spacing between stickers in the stack; and conveyor indexing drive means operatively connected to the indexing conveyor means for intermittently driving the forward an incremental distance related to the desired spacing between stickers in the stack during each cycle of operation to incrementally and progressively move the set of stickers sequentially to the unloading stations during successive cycles of operation.

20. In combination with stacking means for delivering and depositing successive layers of lumber on a stack of lumber in which the stacking means includes:

a frame;

stripping members on the frame facing forward; and a layer handling means movably mounted on the frame for sequentially lifting successive layers of boards from the frame, moving the layers in a forward path over the stripping members, lowering the layers in front of the stripping members, and retracting to move the layers against the stripping members to strip the layers from the layer handling means onto the stack;

a sticker placing apparatus comprising:

sticker handling means for placing stickers at spaced intervals under successive layers on the frame;

supporting and holding means for supporting the spaced stickers under the layers as they are lifted from the frame and deposited onto the stack; and wherein the supporting and holding means comprises brackets mounted to the layer handling means for engaging and lifting stickers against the undersides of the successive layers and holding the stickers in place against the layers as they are moved over the stripping members and onto the stack.

* * * * *